US010852698B2

(12) United States Patent
Tseng

(10) Patent No.: US 10,852,698 B2
(45) Date of Patent: Dec. 1, 2020

(54) WATCH STORAGE DEVICE WITH INTELLIGENT WATCH RECOMMENDATION FUNCTION

(71) Applicant: Andy Tseng, Brea, CA (US)

(72) Inventor: Andy Tseng, Brea, CA (US)

(*) Notice: Subject to any disclaimer, the term of this patent is extended or adjusted under 35 U.S.C. 154(b) by 358 days.

(21) Appl. No.: 16/012,544

(22) Filed: Jun. 19, 2018

(65) Prior Publication Data

US 2019/0384227 A1    Dec. 19, 2019

(51) Int. Cl.
| | | |
|---|---|---|
| *G04B 37/00* | (2006.01) | |
| *G04B 37/12* | (2006.01) | |
| *G04G 21/02* | (2010.01) | |
| *H04N 5/225* | (2006.01) | |
| *G06F 16/9032* | (2019.01) | |

(52) U.S. Cl.
CPC ......... *G04B 37/0008* (2013.01); *G04B 37/12* (2013.01); *G04G 21/02* (2013.01); *G06F 16/90324* (2019.01); *H04N 5/2252* (2013.01)

(58) Field of Classification Search
CPC .... G04B 37/0008; G04B 37/12; G04G 21/02; H04N 5/2252; G06F 16/90324
See application file for complete search history.

(56) References Cited

U.S. PATENT DOCUMENTS

| | | | | |
|---|---|---|---|---|
| 3,602,562 | A * | 8/1971 | Radelfinger | A47F 3/002 312/119 |
| 9,879,467 | B2 * | 1/2018 | Hasselback | H04N 5/2252 |
| 10,339,597 | B1 * | 7/2019 | Blossey | G06T 19/006 |
| 2005/0265129 | A1 * | 12/2005 | Agnoff | G04B 3/006 368/206 |
| 2007/0159032 | A1 | 7/2007 | Louie | |
| 2007/0159929 | A1 * | 7/2007 | Louie | G04D 7/009 368/206 |
| 2008/0088210 | A1 * | 4/2008 | Lerman | A47F 7/022 312/139.1 |
| 2008/0247278 | A1 * | 10/2008 | Walker | G04D 7/009 368/206 |
| 2015/0320209 | A1 * | 11/2015 | Hasselback | H04N 5/2251 348/151 |
| 2016/0019416 | A1 * | 1/2016 | Noguchi | G06F 16/5838 382/190 |
| 2017/0150813 | A1 * | 6/2017 | Stares | A47B 67/04 |
| 2018/0253840 | A1 * | 9/2018 | Tran | G16H 40/63 |
| 2018/0263382 | A1 * | 9/2018 | Dietlin | A47F 3/08 |
| 2020/0005386 | A1 * | 1/2020 | Blossey | G06T 19/20 |

* cited by examiner

*Primary Examiner* — Sean Kayes
(74) *Attorney, Agent, or Firm* — Muncy, Geissler, Olds & Lowe, P.C.

(57) ABSTRACT

A watch storage case with intelligent watch recommendation function includes a casing, a camera module, and a terminal display device. The casing includes a plurality of housing spaces. The camera module is disposed on the casing, so as to photograph the user to generate and transmit an image signal. The terminal display device stores a watch information corresponding to each housed watch. The terminal displaying device receives the image signal and carries out a determination operation to generate and perform a recommendation information. Therefore, a watch wearing recommendation suitable for user style is automatically provided.

10 Claims, 6 Drawing Sheets

WATCH STORAGE DEVICE WITH INTELLIGENT WATCH RECOMMENDATION FUNCTION

BACKGROUND OF THE INVENTION

1. Field of the Invention

The present invention relates to watch storage devices, and more particularly, to a watch storage device with intelligent watch recommendation function.

2. Description of the Related Art

Consumers nowadays tend to have a hobby of collecting multiple watches. For facilitating the storage of watches, each watch is usually placed in a respective watch casing. Also, consumers may choose a suitable watch from the storage casing to wear according to the occasion and the overall dressing.

With technological advantage of watch manufacturing, machine watch is developed, which is automatically winds with the hand motion of the watch wearer. However, when such a mechanical watch is placed in the storage casing for a long time, watch hands will stop, failing to provide a correct time indication.

Therefore, the industry develops an auto-winding watch storage casing. US patent 2007/0159032A1 discloses a watch winding apparatus. With a watch winding device disposed in the watch storage casing, a plurality of mechanical watches are allowed to be placed therein, so as to carry out a winding function upon the housed mechanical watches. Also, the watches are able to be positioned at different angles, allowing the user to select the target mechanical watch from various viewpoints.

However, if the user has a large amount of watches, the user needs to take the costumes and the occasions into consideration when selecting a target watch to wear, such that the user is unable to immediately decide the most suitable watch, increasing the selection difficulty.

SUMMARY OF THE INVENTION

A watch storage device is disclosed, so as to improve the issue of a conventional watch storage casing which only houses a single watch. Also, the present invention provides a watch selection recommendation for the user.

For achieving the aforementioned objectives, a watch storage device with intelligent watch recommendation function, comprising:

a casing comprising a plurality of housing spaces, each housing space housing a watch, respectively;

a camera module disposed on the casing and comprising a signal transmission module, the camera module acquire an image signal of a user; and a terminal display device coupled with the camera module, the terminal display device comprising a data processing module, a watch information module, a signal receiving module, and a displaying module, the watch information module storing a watch information corresponding to each housed watch, wherein the signal receiving module receives the image signal, and the data processing module carries out a determination operation upon the image signal and the watch information, such that a recommendation information is generated and displayed through the displaying module.

Therefore, according to the general costume style of the user, the present invention carries out a determination operation to provide a recommendation of a target watch having a suitable style, efficiently assisting the user in selecting a suitable watch to wear.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Figure 5:
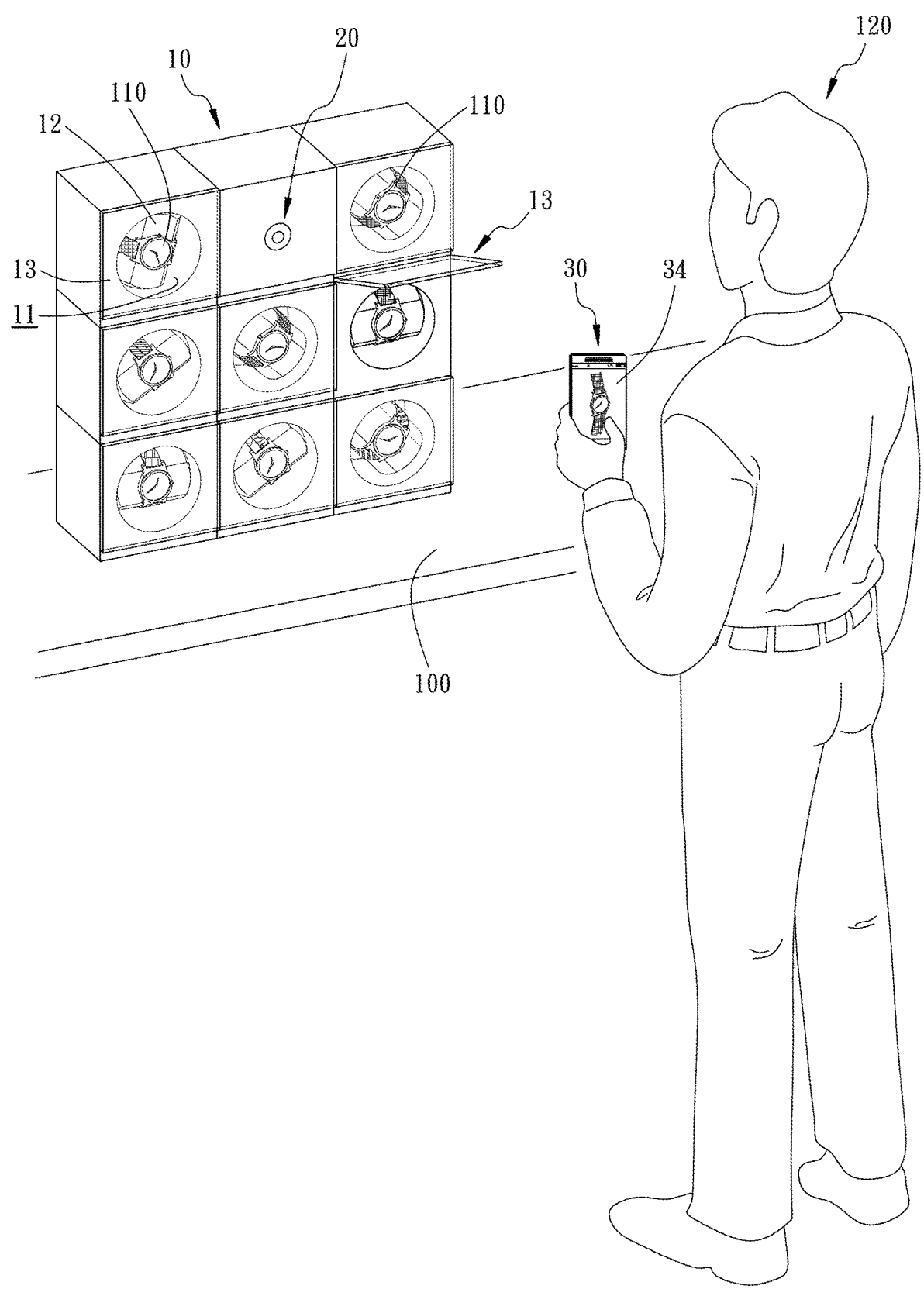
FIG. 5 is another schematic view of the operation status of the watch storage device in accordance with an embodiment of the present invention, illustrating the recommendation information displayed on the terminal display device.
Figure 6:
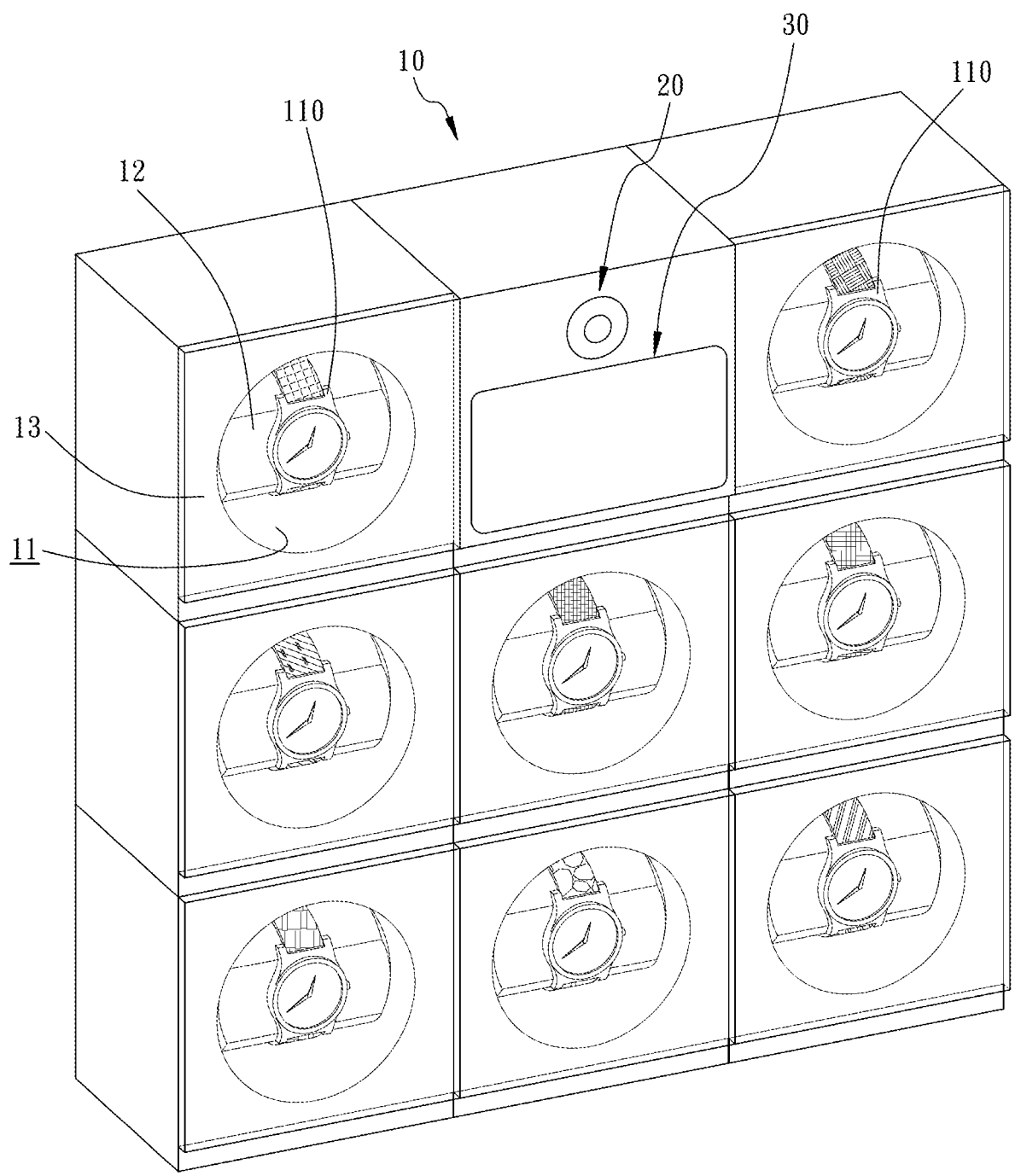
FIG. 6 is a perspective view of the watch storage device in accordance with another embodiment of the present invention.

Referring to FIG. 1 to FIG. 6, a watch storage device with intelligent watch recommendation function in accordance with an embodiment of the present invention comprises a casing 10, a camera module 20, and a terminal display device 30. The camera module 20 is disposed on one lateral side of the casing 10 and coupled with the terminal display device 30, wherein the terminal display device 30 is allowed to be a handheld intelligent portable device which is wireless connected with the camera module 20, as shown by FIG. 5. Alternatively, the terminal display device 30 and the camera module 20 are disposed on the same lateral side of the casing 10, and the terminal display device 30 is connected with the camera module 20 via a cable, as shown by FIG. 6.

The casing 10 stands on a plane surface 100. The casing 10 is internally divided into a plurality of housing spaces 11. In an embodiment of the present invention, a total of, for example but not limited to, eight housing spaces 11 are provided. Further, in an embodiment of the present invention, each watch 110 is a mechanical watch, and a watch winding module 12 is provided at the casing 10 corresponding to each housing space 11. The watch 110 is placed on the corresponding watch winding module 12, such that the watch winding module 12 is configured to automatically wind the watch 110. In the practical utility, the present invention is not limited to be applied to mechanical watches and auto-winding watch storage casing; in other words, the present invention is allowed to be applied to an ordinary casing 10 which stores a plurality watches 110.

In addition, each housing space 11 of the casing 10 is provided with a lid 13, and a lid control device 14 is disposed between the casing 10 and each lid 13, wherein the lid control device 14 is coupled with the terminal display device 30 for controlling the opening and closing of the corresponding lid 13.

The camera module 20 is disposed on a lateral side of the casing 10 which is arranged in vertical to the plane surface 100. In an embodiment of the present invention, the camera module 20 is disposed in adjacent to the central top position of the casing 10. The camera module 20 is applied for photographing toward the user 120, so as to acquire an image signal. Also, the camera module 20 further includes a signal transmission unit 21.

Figure 1:
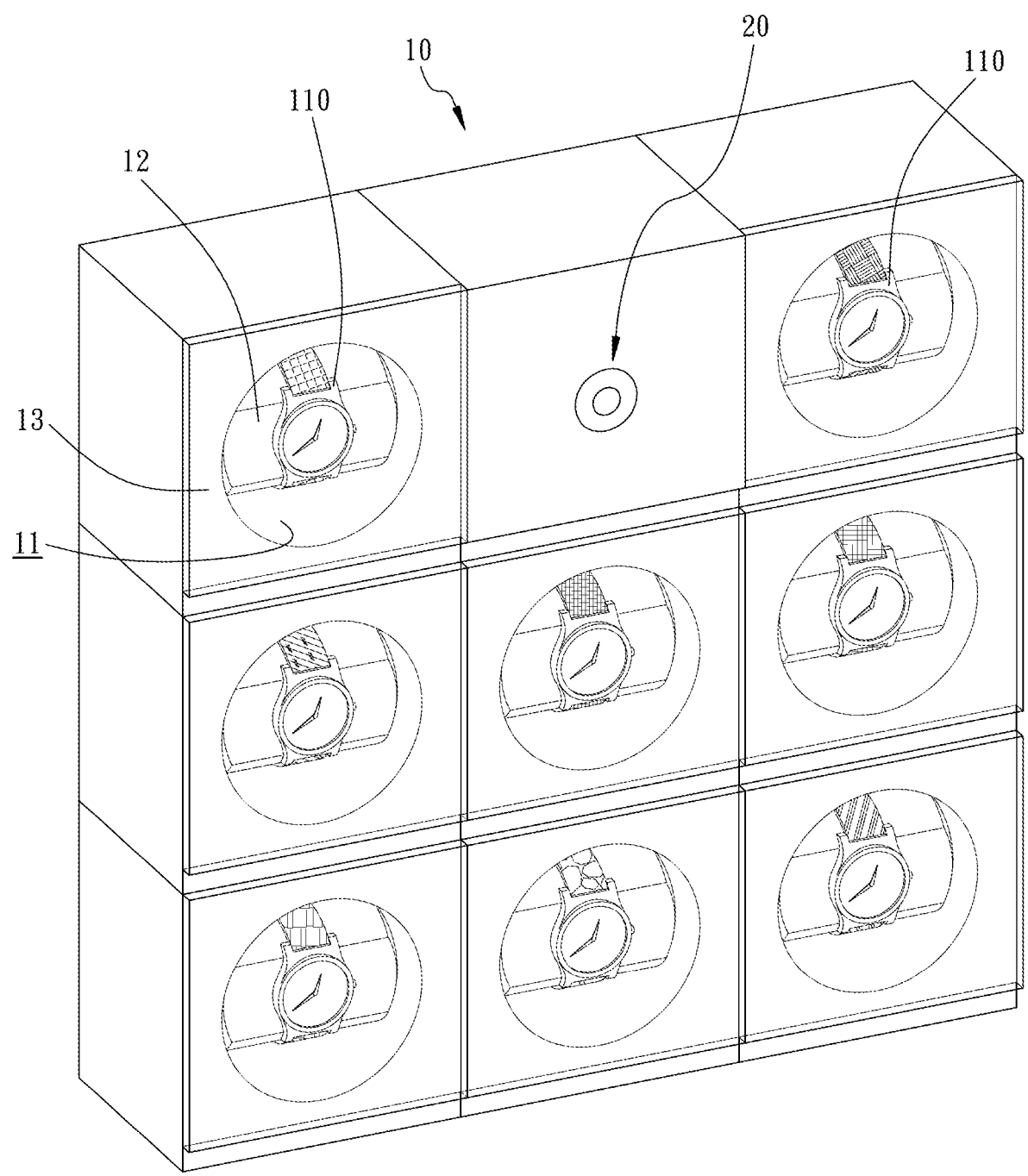
FIG. 1 is a perspective view of the watch storage device in accordance with an embodiment of the present invention.
Figure 2:
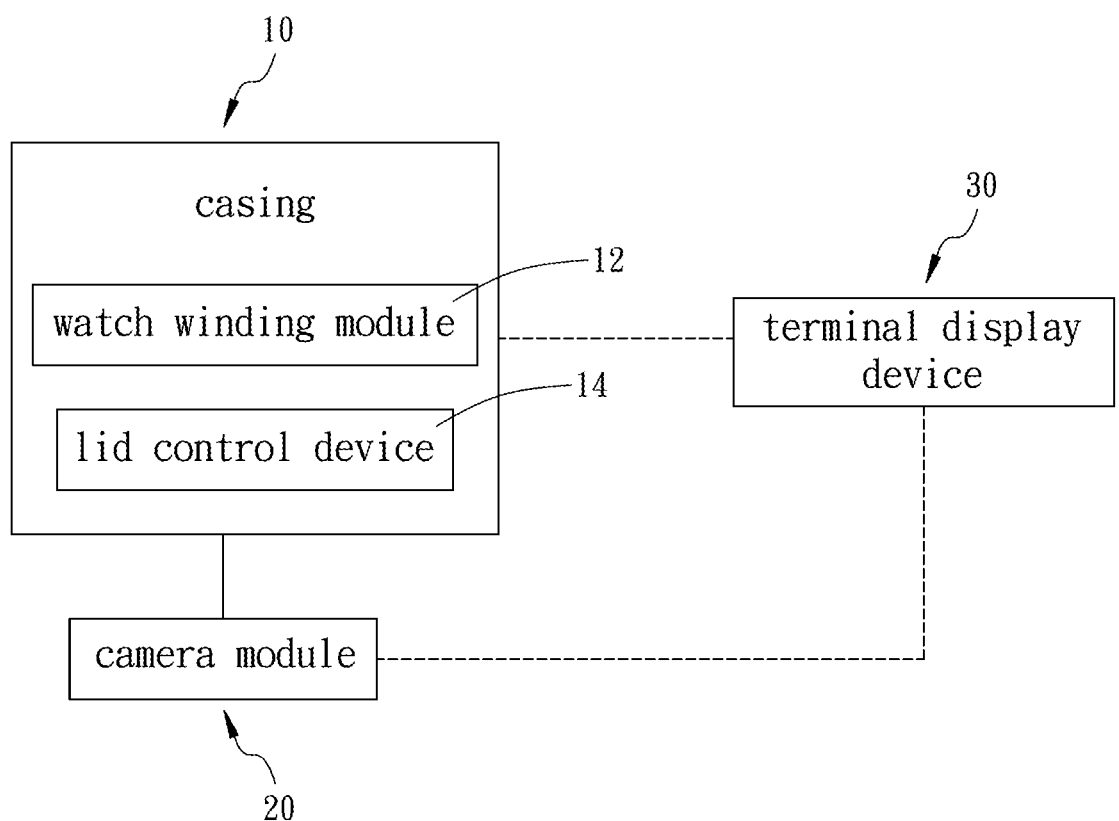
FIG. 2 is a schematic view illustrating the system structure of the watch storage device in accordance with an embodiment of the present invention.
Figure 3:
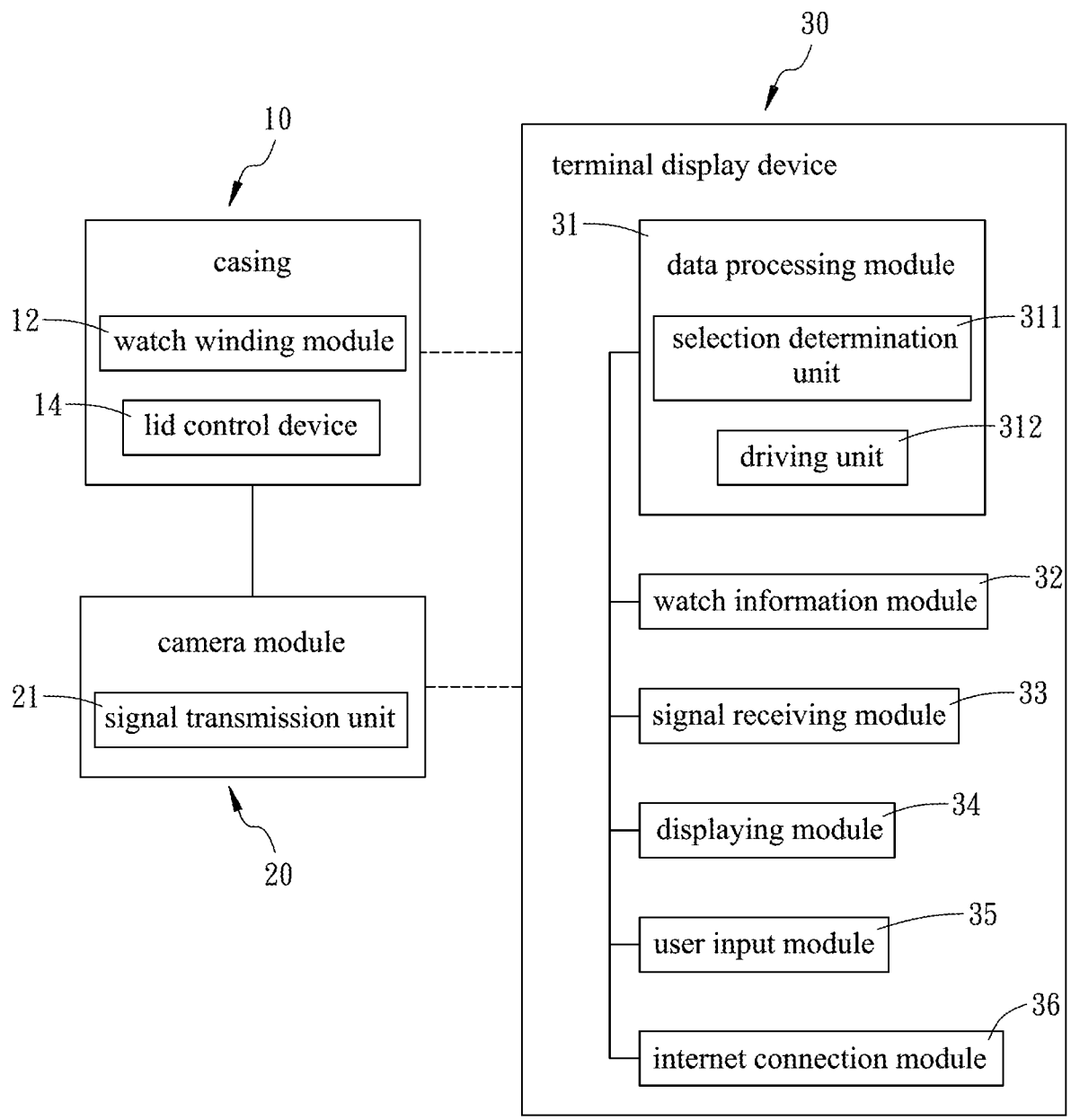
FIG. 3 is a detailed schematic view illustrating the system structure of the watch storage device.
Figure 4:
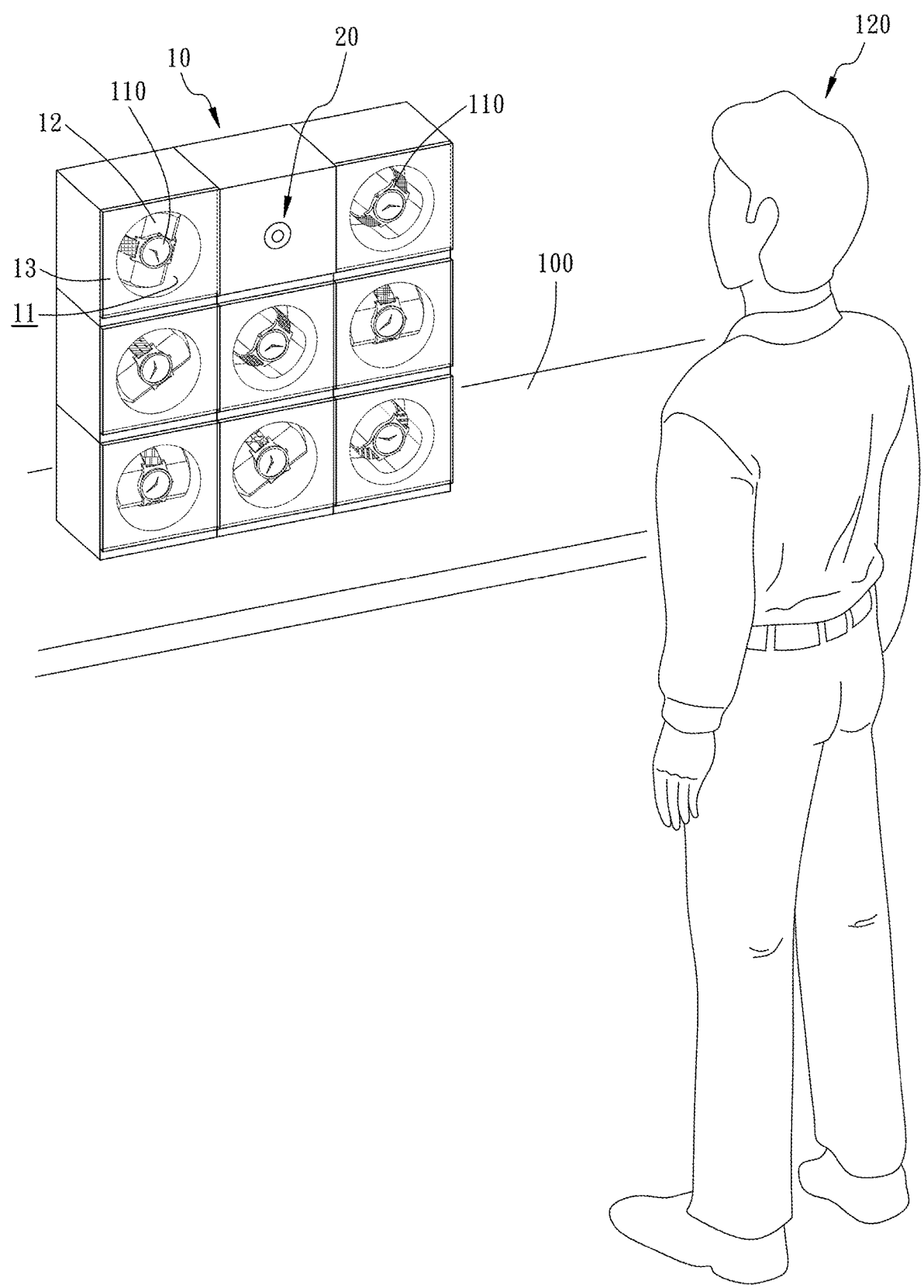
FIG. 4 is a schematic view of the operation status of the watch storage device in accordance with an embodiment of the present invention, illustrating the camera module acquiring an image of the user.

The terminal display device 30 includes a data processing module 31, a watch information module 32, a signal receiving module 33, and a displaying module 34, wherein the data processing module 31, the watch information module 32, the signal receiving module 33, and the displaying module 34 are coupled with each other. The watch information module 32 stores a watch information corresponding to each housed watches 110, wherein the watch information includes a specification information indicating the brand and model of the watch 110, a position information indicating the housing space 11 containing the corresponding watch 110, and a pattern information indicating the appearance and colors of the corresponding watch 110. The signal receiving module 33 receives the image signal. Notably, when the terminal display device 30 is a handheld intelligent portable device, the signal receiving module 33 is allowed to, through a Bluetooth or the internet, wirelessly receives the image signal transmitted by the signal transmission unit 21, as shown by FIG. 3 and FIG. 5. When the terminal display device 30 is disposed on the casing 10, the signal receiving module 33 receives the image signal transmitted by the signal transmission unit 21 via a cable, as shown by FIG. 3 and FIG. 6.

The data processing module 31 carries out a determination operation upon the image signal and the watch information, so as to generate a recommendation information. More specifically, the data processing module 31 includes a selection determination unit 311. The selection determination unit 311 carries out a determination operation according to the costume style and costume colors indicated by the image signal, so as to generate a recommendation information, thus providing the model and style of the watch 110 which is suitable for the overall costume of the user 120. The displaying module 34 is a display monitor for displaying the recommendation information. The user 120 is able to open a corresponding lid 13 according to the recommendation information, and take out the target watch 110 to wear. Therefore, a suitable watch 110 for the user 120 to wear is recommended by the present invention.

In addition, in another embodiment of the present invention, the data processing module 31 further comprises a driving unit 312. The driving unit 312 generates a lid opening signal according to the recommendation information, and the lid control device 14 receives the lid opening signal, so as to open the corresponding lid 13, increasing the convenience of taking out the target watch 110.

Further, the terminal display device 30 further includes a user input module 35 and an internet connection module 36 that are coupled with the data processing module 31. The user input module 35 allows the user 120 to input a user information, such as the occasion which the user 120 will be attending, the style and model of a watch which the user 120 wishes to wear, or an appointment information that are downloaded from the schedule of the user 120. Therefore, the data processing module 31 is able to carry out the determination operation upon the image signal, the user information, and the watch information, thereby generating a corresponding recommendation information of the style and model of the suitable watch 110 which more accurately meets the demand of the user 120. More specifically, the appointment information downloaded from the schedule of the user 120 allows the data processing module 31 to carry out the determination operation according to the keywords or locations of the schedule, so as to make sure the occasion and activity, thereby determining whether the user 120 is going to attend a leisure occasion, formal occasion, or sport occasion. Also, the internet connection module 36 is able to acquire the watch information from the internet. For example, the user 120 stores the information corresponding to each watch 110 in the watch information module 32, and the internet connection module 36 downloads a detailed watch information, such as patterns, introduction, and styles of each watch 110. Therefore, the user 120 does not need to manually input the watch information, facilitating the convenience of usage.

Referring to FIG. 2 to FIG. 5, when operating the watch selection function of the present invention, the user 120 wears a formal costume and stands in front of the casing 10, and then activates to the camera module 20 to photograph toward the user 120. The image signal is generated and transmitted to the terminal display device 30, and the user 120 is also allowed to addition input the user information through the user input module 35. For example, the user information indicates that the user 120 is going to attend an opening ceremony reception, and the data processing module 31 will carry out the determination operation according to the acquired image signal, user information, and watch information, so as to generate a suitable recommendation information. Next, the driving unit 312 of the data processing module 31 controls the lid control device 14 according to the recommendation information, thereby opening the corresponding lid 13 and allowing the user 120 to take out the target watch 110 from the casing 10.

With the foregoing configuration, the present invention achieves following objectives.

According to the image signal acquired by the camera module 20 from the user 120, the present invention determines and provides the style and model of a watch 110 which is suitable for the overall costume of the user 120, achieving an intelligent watch 110 selection function, saving the time needed for the user 120 to select the target watch 110.

When the displaying module 34 displays the recommendation information, the driving unit 312 of the data processing module 31 controls the lid control device 14 to open the lid 13 according to the recommendation information, allowing the user 120 to take out the target watch 110, facilitating the convenience of usage.

The user input module 35 allows the user 120 to input a detailed user information for the data processing module 31 to carry out a further determination operation, so as to generate a corresponding recommendation information of the style and model of the suitable watch 110 which more accurately meets the demand of the user 120.

With the internet connection module 36, the user 120 does not need to manually input watch information. Also, the user information is able to be download from the schedule of the user 120, allowing the determination operation to be carried out with higher accuracy for recommending the most suitable style of the watch 110.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A watch storage device with intelligent watch recommendation, comprising:
a casing comprising a plurality of housing spaces, each housing space housing a watch, respectively;
a camera module disposed on the casing and comprising a signal transmission module, the camera module acquire an image signal of a user; and
a terminal display device coupled with the camera module, the terminal display device comprising a data processing module, a watch information module, a signal receiving module, and a displaying module, the watch information module storing a watch information corresponding to each housed watch,
wherein the signal receiving module receives the image signal, and the data processing module carries out a determination operation upon the image signal and the watch information, such that a recommendation information is generated and displayed through the displaying module.

2. The watch storage device of claim 1, wherein the casing comprises a plurality of lids and a plurality of lid control device corresponding to each housing space, with the lid control device disposed between the casing and the corresponding lid, each lid control device is coupled with the terminal display device, and each lid control device controls the corresponding lid to open and close.

3. The watch storage device of claim 2, wherein the data processing module comprises a selection determination unit and a driving unit, the selection determination unit carrying out a determination operation according to a costume style and costume colors of the image signal and generating a recommendation information, the driving unit generating a lid opening signal according to the recommendation information and controlling the lid control device to open one of the lid.

4. The watch storage device of claim 1, wherein the casing stands on a plane surface, and the camera module is disposed on a lateral side of the casing which is vertical to the plane surface.

5. The watch storage device of claim 1, wherein the terminal display device is disposed on the casing, such that the recommendation information is displayed on the casing.

6. The watch storage device of claim 1, wherein the terminal display device is a handheld intelligent portable device which is wirelessly connected with the camera module.

7. The watch storage device of claim 1, wherein the terminal display device further comprises a user input module coupled with the data processing module, the user inputting a user information through the user input module, such that the data processing module carries out the determination operation according to the image signal, the user information, and the watch information, so as to generate the recommendation information.

8. The watch storage device of claim 1, wherein the watch information includes a specification information indicating the brand and model of the watch, a position information indicating the housing space containing the corresponding watch, and a pattern information indicating the appearance and colors of the corresponding watch.

9. The watch storage device of claim 1, wherein the terminal display device further comprises an internet connection module, the internet connected module coupled with the data processing module and capable of acquiring the watch information from internet.

10. The watch storage device of claim 1, wherein the casing further comprises a plurality of watch winding module corresponding to the plurality of housing spaces, such that each watch is placed on the watch winding module corresponding to each housing space, and each watch winding module applied for winding the corresponding watch.

* * * * *